United States Patent [19]

Goetz et al.

[11] Patent Number: 5,254,620
[45] Date of Patent: Oct. 19, 1993

[54] THERMOPLASTIC MOLDING COMPOSITIONS BASED ON POLYAMIDES AND THERMOPLASTIC POLYESTER ELASTOMERS

[75] Inventors: Walter Goetz; Walter Betz, both of Ludwigshafen; Gunter Pipper, Bad Duerkheim, all of Fed. Rep. of Germany

[73] Assignee: BASF Aktiengesellschaft, Ludwigshafen, Fed. Rep. of Germany

[21] Appl. No.: 801,195

[22] Filed: Dec. 2, 1991

[30] Foreign Application Priority Data

Dec. 8, 1990 [DE] Fed. Rep. of Germany ....... 4039420

[51] Int. Cl.⁵ ............................................... C08L 77/00
[52] U.S. Cl. .................................... 524/538; 524/539; 525/425; 525/437
[58] Field of Search ................ 525/425, 437; 524/538, 524/539

[56] References Cited

U.S. PATENT DOCUMENTS

| | | |
|---|---|---|
| 4,229,340 | 10/1980 | Druin et al. ........................... 260/40 |
| 4,791,027 | 12/1988 | Reimann et al. . |
| 5,034,450 | 7/1991 | Betz ........................................ 524/538 |

FOREIGN PATENT DOCUMENTS

| | | |
|---|---|---|
| 331001 | 9/1989 | European Pat. Off. . |
| 3926865 | 2/1991 | Fed. Rep. of Germany . |
| 60-106854 | 6/1985 | Japan . |
| 1476997 | 6/1977 | United Kingdom . |

OTHER PUBLICATIONS

Patent Abstracts of Japan, vol. 11, No. 282 (C-446) Sep. 11, 1987.

*Primary Examiner*—Patricia A. Short
*Attorney, Agent, or Firm*—Keil & Weinkauf

[57] ABSTRACT

Thermoplastic molding compositions are obtainable by mixing

A) from 0.5 to 5% by weight of a thermoplastic polyester elastomer and
B) from 0 to 50% by weight of fibrous or particulate fillers or mixtures thereof into a melt of
C) from 40 to 99.5% by weight of a polyamide prepolymer having a viscosity number of from 40 to 80 ml/g and subsequent postcondensation in solid phase.

1 Claim, 1 Drawing Sheet

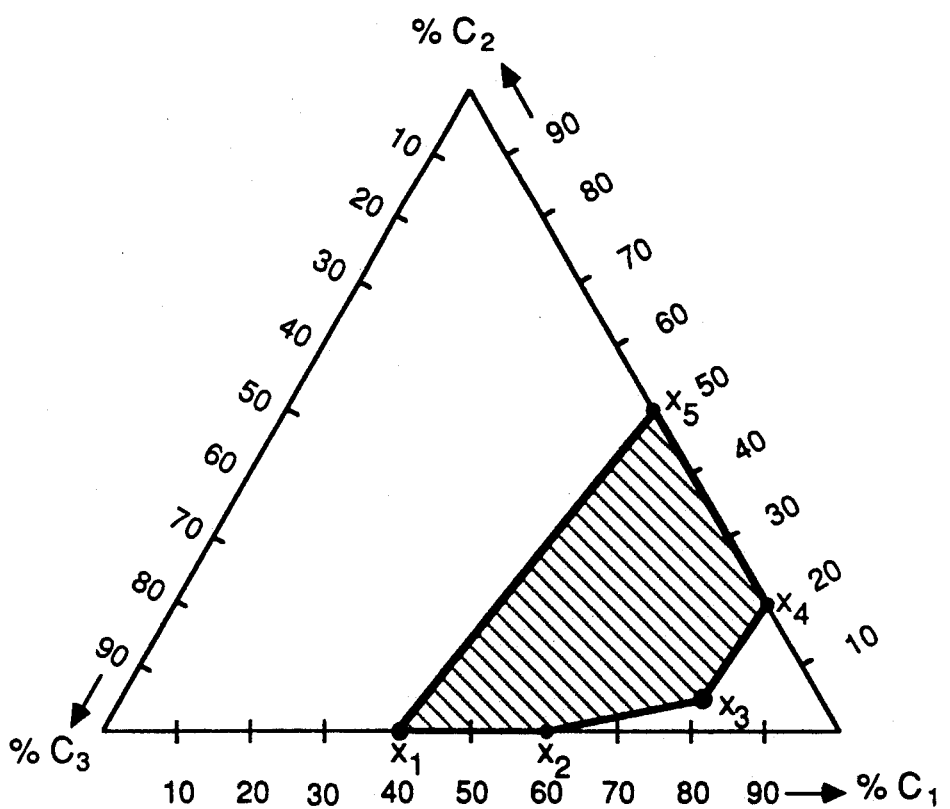

THERMOPLASTIC MOLDING COMPOSITIONS BASED ON POLYAMIDES AND THERMOPLASTIC POLYESTER ELASTOMERS

The present invention relates to thermoplastic molding compositions obtainable by mixing A) from 0.5 to 5% by weight of a thermoplastic polyester elastomer and B) from 0 to 50% by weight of fibrous or particulate fillers or mixtures thereof into a melt of C) from 40 to 99.5% by weight of a polyamide prepolymer having a viscosity number of from 40 to 80 ml/g and subsequent postcondensation in solid phase.

The present invention also relates to processes for preparing these thermoplastic molding compositions, to the use thereof for producing fibers, films and moldings, and to the moldings thus obtainable.

Polyamides such as poly-$\epsilon$-caprolactam and polyhexamethyleneadipamide are well known engineering plastics and have found application in many fields. In general they possess great hardness, stiffness and good heat resistance, they are resistant to abrasion and wear and also to many chemicals, and they are flame-resistant.

In the processing of polyamides, in particular in injection molding, it is generally customary to add lubricants to improve the feed and demolding characteristics.

For instance, DE-A-37 06 356 describes polyamide granules with an outer lubricant coating comprising zinc stearate, aluminum stearate, calcium stearate and $C_2$-$C_{24}$-esters of aliphatic carboxylic acids of from 6 to 24 carbon atoms.

DE-A-23 49 835 discloses the addition of calcium stearate or zinc stearate to polyamide molding compositions.

However, the addition of these lubricants leads to a molecular weight degradation, associated with a toughness loss in the processing of polyamides, in particular at elevated temperature. This effect is particularly pronounced with high-melting polyamides such as copolyamides of $\epsilon$-caprolactam, hexamethylenediamine and terephthalic acid and of tetramethylenediamine and adipic acid. But these disadvantages are also found in polyamides of hexamethylenediamine and adipic acid, especially on addition of aluminum stearate. Moreover, the addition of these lubricants robs the polyamides of their flame-resistance.

The use of stearic acid, stearyl stearate, pentaerythritol and diglycol esters of long-chain fatty acids, palmitic acid, behenic acid and derivatives thereof as lubricants is likewise known. These compounds likewise have the abovementioned disadvantages.

If these lubricants are incorporated into a melt of a polyamide prepolymer having a viscosity number of from 40 to 80 ml/g and this mixture is subjected to a thermal aftertreatment to obtain the viscosity numbers of not less than 140 ml/g necessary for engineering applications, they are extracted at the prevailing processing temperatures and thus become ineffective.

Examples of lubricants which are not based on derivatives of long-chain fatty acids are polytetrafluoroethylene, molybdenum sulfide and graphite. Their disadvantages are in particular the dark self-color and economic and health aspects.

JP-A2-106 854/85 describes polyamides containing a mixture of acrylate rubbers and polyether esters as impact modifying components. However, these products are very soft and readily flammable.

DE-A-39 26 895 discloses the addition of a mixture of polyether esters and aluminum salts to polyamides. This again has the aforementioned disadvantages of the molecular weight degradation of the polyamides due to the use of aluminum salts and the extraction of the lubricants on incorporation thereof into a polyamide prepolymer having a viscosity number of from 40 to 80 ml/g at the prevailing processing temperatures.

EP-A-331 001 describes the addition of polyether esters to improve the flowability of polyamides. However, these processes lead to products which are not flame-resistant.

It is an object of the present invention to provide polyamide-based thermoplastic molding compositions which do not have the afore-described disadvantages and which shall possess in particular good flowability and flame resistance.

We have found that this object is achieved according to the present invention by the thermoplastic molding compositions defined at the beginning. Preferred compositions of this kind are revealed in the subclaims.

We have also found processes for preparing these thermoplastic molding compositions, the use thereof for producing fibers, films and moldings, and the moldings thus obtainable.

Component A) of the thermoplastic molding compositions of the present invention comprises from 0.5 to 5% by weight, preferably from 1.5 to 2.5% by weight, of a thermoplastic polyester elastomer.

For the purposes of the present invention polyester elastomers are segmented copolyether esters which contain long-chain segments which in general are derived from poly(alkylene ether) glycols and short-chain segments which are derived from low molecular weight diols and dicarboxylic acids.

Such products are known per se and described in the literature. By way of example there may be mentioned U.S. Pat. Nos. 3,651,014, 3,784,520, 4,185,003 and 4,136,090 and some papers by G. K. Hoeschele (Chimia 28 (9) (1974), 544; Angew. Makromolek. Chemie 58/59 (1977), 299–319; and Pol. Eng. Sci. 1974, 848). Products of this type are also commercially available under the designations Hytrel ® (DuPont), Arnitel ® (Akzo) and Pelprene ® (Toyobo Co. Ltd.).

In general, thermoplastic copolyether ester elastomers are composed of long-chain segments of the formula

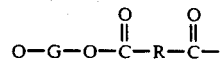

and short-chain segments of the formula

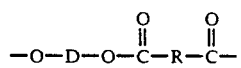

where

G is a divalent radical which is formed on removing the terminal hydroxyl groups of a poly(alkylene oxide) glycol having a molecular weight of preferably 400–6000, in particular 600–4000, D is a divalent radical which is formed on removing the terminal hydroxyl groups of a low molecular weight diol having a molecular weight of preferably less than 250, and R is a divalent radical which is formed on removing the carboxyl groups of a dicarboxylic acid having a molecular weight of preferably less than 300.

The molecular weight in question here is the number average molecular weight.

It will be readily understood that it is also possible to use mixtures of a plurality of poly(alkylene oxide) glycols, a plurality of diols or a plurality of dicarboxylic acids.

The poly(alkylene oxide) glycols HO—G—OH preferably have a melting point of less than 55° C. and a carbon/oxygen molar ratio of preferably from 2 to 10, in particular from 2 to 6.

Examples of poly(alkylene oxide) glycols are poly(ethylene oxide) glycol, poly(1,2-propylene oxide)glycol, poly(1,3-propylene oxide) glycol, poly(1,2-butylene oxide) glycol, poly(1,3-butylene oxide) glycol, poly(1,4-butylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and also random or block copolymers of various of the aforementioned glycols. Preference is given to poly(ethylene oxide) glycol, poly(1,2-propylene oxide) glycol, poly(1,3-propylene oxide) glycol and poly(1,4-butylene oxide) glycol and mixtures thereof. The weight proportion of the long-chain segments which are derived from the foregoing polyalkylene oxide glycols and dicarboxylic acids is in general within the range from 5 to 70% by weight, preferably from 7 to 50% by weight, based on the total weight of component A).

Suitable diols HO-D-OH are in general low molecular weight diols having molecular weights of preferably less than 250. They can have a linear or branched, cycloaliphatic or aromatic structure.

Diols of from 2 to 15 carbon atoms are preferred. Examples are 1,2-ethanediol, 1,3-propanediol, 1,2-propanediol, 1,4-butanediol, 1,3-butanediol, 1,2-butanediol, 1,5-pentanediol, 2,2-dimethyl-1,3-propanediol, 1,6-hexanediol and isomers thereof, decamethylenediol, the isomeric dihydroxycyclohexanes, resorcinol, hydroquinone and the various dihydroxynaphthalenes. Of these, especially aliphatic diols of 2 to 8, in particular from 2 to 4, carbon atoms are preferred (1,2-ethanediol, 1,3-propanediol, 1,4-butanediol).

In some cases it may also be advantageous to use unsaturated diols, for example but-2-ene-1,4-diol, in particular mixed with the aforementioned saturated diols. Examples of polyether esters of such mixtures are revealed in EP-A-49 823.

Finally, suitable diols also include diphenols such as 4,4'-dihydroxybiphenyl, di(4-hydroxyphenyl)methane and 2,2-di(4-hydroxyphenyl)propane (frequently also referred to as bisphenol A).

Instead of the diols it is of course also possible to use their ester forming derivatives; in these cases, the molecular weight may of course also be more than 250, depending on the nature of the derivative, since the preferred molecular weight range (MW<250) relates to the diols themselves.

The dicarboxylic acids HOOC—R—COOH preferably have molecular weights of less than 300 and can be aromatic, aliphatic or cycloaliphatic. The dicarboxylic acids may also have substituents which do not interfere with the course of the polymerization reaction.

Examples of aromatic dicarboxylic acids are terephthalic acid, isophthalic acid, substituted dicarboxylic acids of the formula

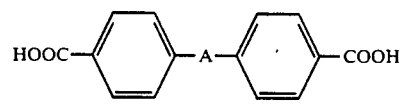

where A is a chemical bond, alkylene of 1 to 3 carbon atoms, —CO—, —S— or —SO$_2$—, 1,5-, 2,6- or 2,7-naphthalenedicarboxylic acid and the C$_1$-C$_6$-alkyl-substituted derivatives thereof. Of these, terephthalic acid, isophthalic acid, mixtures thereof or mixtures of terephthalic acid or isophthalic acid with other dicarboxylic acids are preferred.

Examples of aliphatic dicarboxylic acids which can be used are oxalic acid, fumaric acid, maleic acid, citraconic acid, sebacic acid, adipic acid, glutaric acid, succinic acid and azelaic acid, to name but a few.

It will be understood that it is also possible to use mixtures of various aliphatic dicarboxylic acids. As with the diols it is also possible to use instead of the acids themselves their ester-forming derivatives. This has in fact been found to be particularly advantageous in some cases.

For further long-chain glycols HO—G—OH, short-chain diols HO—D—OH and dicarboxylic acids HOOC—R—COOH, reference is made to U.S. Pat. No. 3,651,014.

As mentioned earlier, the proportion of the long-chain segments is in general from 5 to 70% by weight, preferably from 7 to 50% by weight, and the proportion of short-chain segments is correspondingly from 30 to 95% by weight, preferably from 50 to 93% by weight. The weight proportion of each type of segment has a bearing inter alia on the hardness of the products.

The dicarboxylic acids in the long-chain and short-chain segments can be identical or different; similarly, mixtures of diols or dicarboxylic acids can also be used in the preparation of the long-chain and short-chain segments.

The above remarks indicate that a multiplicity of different segmented co(polyether ester)s can be used as component A). Of these, copolyether esters whose long-chain units are derived from poly(1,4-alkylene oxide) glycol having a molecular weight of from 600 to 2000, terephthalic acid and 1,4-butanediol are preferred.

In some cases it has been found to be advantageous to replace some of the terephthalic acid by isophthalic acid, adipic acid or sebacic acid or some of the 1,4-butanediol by other diols, for example 1,3-propanediol, 1,5-pentanediol or but-2-ene-1,4-diol. Such products are described in U.S. Pat. No. 3,651,014 and EP-A-49 823.

Processes for preparing segmented co(polyether ester)s are known per se and described in the literature, making further comment superfluous. Reference may merely be made to U.S. Pat. Nos. 3,651,014, 3,784,520 and a review by G. K. Hoeschele (Chimia 28 (1974), 544).

The co(polyether ester)s A) may contain stabilizers for protection against thermal or oxidative degradation, as described for example in U.S. Pat. Nos. 4,136,090 and 4 185 003 and in a paper by G. K. Hoeschele (Angew. Makromolekulare Chemie 58/59 (1977), 299-319).

Component B) of the thermoplastic molding compositions of the present invention comprises customary additives and processing aids such as stabilizers, oxidation retardants, thermal stabilizers, UV absorbers, demolding agents, colorants such as dyes and pigments, fibrous and pulverulent fillers and reinforcing agents, nucleating agents, plasticizers, etc., the amount of which generally does not exceed 50% by weight.

Examples of oxidation retardants and heat stabilizers are halides of metals of group I of the Periodic Table, for example sodium, potassium and/or lithium halides, alone or combined with copper(I) halides, for example chlorides, bromides, or iodides, sterically hindered phenols, hydroquinones, aromatic secondary amines such as diphenylamines, various substituted representatives of these groups and mixtures thereof, in concentrations of up to 1% by weight, based on the weight of the thermoplastic molding compositions.

Suitable UV stabilizers, which in general are used in amounts of up to 2% by weight, based on the molding composition, are various substituted resorcinols, salicylates, benzotriazoles and benzophenones.

It is also possible to add organic dyes such nigrosine, pigments such as titanium dioxide, cadmium sulfide, cadmium selenide, phthalocyanines, ultramarine blue and carbon black as colorants and also fibrous and pulverulent fillers and reinforcing agents. Examples of the latter are carbon fibers, glass fibers, amorphous silica, asbestos, calcium silicate (wollastonite), aluminum silicate, magnesium carbonate, kaolin, chalk, quartz powder, mica and feldspar. The proportion of such fillers and colorants is in general up to 50% by weight, preferably 20 to 35% by weight.

The nucleating agents used can be for example chalk, calcium fluoride, sodium phenylphosphinate, alumina and finely divided polytetrafluoroethylene.

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

Other suitable additives are all flameproofing agents known for polyamides, in particular those based on phosphorus compounds or red phosphorus itself.

Component C) of the thermoplastic molding compositions of the present invention comprises from 40 to 99.5% by weight, preferably from 92 to 99% by weight, in particular from 97.5 to 98.5% by weight, of a polyamide prepolymer having a viscosity number of from 40 to 80 ml/g, preferably 45 to 65 ml/g, measured on a 0.5% strength by weight solution in concentrated sulfuric acid at 23° C.

Suitable polyamides which can be used for preparing component C) are thermoplastic partly crystalline polyamides.

It is in particular also possible to use aromatic copolyamides which are partly crystalline and formed essentially from $C_1$) 20-90% by weight of units derived from terephthalic acid and hexamethylenediamine, $C_2$) 0-50% by weight of units derived from ,-caprolactam εand $C_3$) 0-80% by weight of units derived from adipic acid and hexamethylenediamine.

The component $C_1$) contains 20-90% by weight of units derived from terephthalic acid and hexamethylenediamine. A small proportion of the terephthalic acid, preferably not more than 10% by weight of the total aromatic dicarboxylic acids used, can be replaced with isophthalic acid or other aromatic dicarboxylic acids, preferably those in which the carboxyl groups are in the para position.

As well as units derived from terephthalic acid and hexamethylenediamine, the copolyamides contain units derived from ε-caprolactam and/or units derived from adipic acid and hexamethylenediamine.

The proportion of units derived from ε-caprolactam is not more than 50% by weight, preferably from 20 to 50% by weight, in particular from 25 to 40% by weight, while the proportion of units derived from adipic acid and hexamethylenediamine is up to 80% by weight, preferably from 30 to 75% by weight, in particular from 35 to 65% by weight.

The copolyamides may also contain not only units of ε-caprolactam but also units of adipic acid and hexamethylenediamine; in this case, it is of advantage when the proportion of units which are free of aromatic groups is at least 10% by weight, preferably at least 20% by weight. The ratio of units derived from ε-caprolactam on the one hand and from adipic acid and hexamethylenediamine on the other is not subject to any special restriction.

BRIEF DESCRIPTION OF THE DRAWING

Preference is given to copolyamides whose composition lies in the ternary diagram in the pentangle defined by cornerpoints $X_1$ to $X_5$, the points $X_1$ to $X_5$ being defined as follows:

| | |
|---|---|
| $X_1$ | 40% by weight of units $C_1$) |
| | 60% by weight of units $C_3$) |
| $X_2$ | 60% by weight of units $C_1$) |
| | 40% by weight of units $C_3$) |
| $X_3$ | 80% by weight of units $C_1$) |
| | 5% by weight of units $C_2$) |
| | 15% by weight of units $C_3$) |
| $X_4$ | 80% by weight of units $C_1$) |
| | 20% by weight of units $C_2$) |
| $X_5$ | 50% by weight of units $C_1$) |
| | 50% by weight of units $C_2$) |

The drawing shows the pentangle which is defined by these points inside a ternary diagram.

Polyamides which are particularly advantageous for many purposes contain from 50 to 80, in particular from 60 to 75, % by weight of units derived from terephthalic acid and hexamethylenediamine (units $C_1$)) and from 20 to 50, preferably from 25 to 40, % by weight of units derived from ε-caprolactam (units $C_2$)).

As well as the above-described units $C_1$) to $C_3$), the partly aromatic copolyamides may contain minor amounts, preferably not more than 15% by weight, in particular not more than 10% by weight, of further polyamide building blocks as known from other polyamides. These building blocks can be derived from dicarboxylic acids of from 4 to 16 carbon atoms and aliphatic or cycloaliphatic diamines of from 4 to 16 carbon atoms and also from aminocarboxylic acids or the corresponding lactams of from 7 to 12 carbon atoms. Suitable monomers of this type are suberic acid, azelaic acid, sebacic acid and isophthalic acid as representatives of dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane as representatives of diamines, and capryllactam, enantholactam, omega-aminoundecanoic acid and laurolactam as representatives of lactams and aminocarboxylic acids.

Other particularly advantageous partly aromatic copolyamides are those whose triamine content is less than 0.5, preferably less than 0.3, % by weight.

Partly aromatic copolyamides prepared by most existing processes (cf. U.S. Pat. No. 4,603,166) have triamine contents of above 0.5% by weight, which leads to a deterioration in product quality and to problems with continuous production. The triamine responsible for these problems is in particular dihexamethylenetriamine, formed from the hexamethylenediamine used in the preparation.

Copolyamides of a low triamine content have for the same solution viscosity a lower melt viscosity than products of similar composition which have a higher triamine content. This improves not only the processing but also the product properties.

The melting points of the partly aromatic copolyamides lie within the range from 260° C. to above 300° C., this high melting point also being associated with a high glass transition temperature of in general more than 75° C., in particular more than 85° C. (in the dry state).

Binary copolyamides based on terephthalic acid, hexamethylenediamine and ε-caprolactam which contain about 70% by weight of units derived from terephthalic acid and hexamethylenediamine have melting points of the order of 300° C. and (in the dry state) a glass transition temperature of more than 110° C.

Binary copolyamides based on terephthalic acid, adipic acid and hexamethylenediamine reach melting points of 300° C. or more even at lower levels of about 55% by weight of units of terephthalic acid and hexamethylenediamine (HMD), although the glass transition temperature is not quite as high as in the case of binary copolyamides which contain ε-caprolactam instead of adipic acid or adipic acid/HMD.

Further suitable polyamides can be prepared for example by condensation of equimolar amounts of saturated dicarboxylic acid of from 4 to 12 carbon atoms with a diamine of 4 to 14 carbon atoms or by condensation of ω-aminocarboxylic acids or polyaddition of lactams.

Examples of polyamides are polyhexamethyleneadipamide, polyhexamethyleneazelamide, polyhexamethylenesebacamide, polyhexamethylenedodecanediamide, polytetramethyleneadipamide and the polyamides obtained by ring opening of lactams such as polycaprolactam and polylaurolactam.

In general, these partly crystalline polyamides are linear.

Particular preference is given to polytetramethyleneadipamide, polyhexamethyleneadipamide and copolyamides of terephthalic acid, hexamethylenediamine and ε-caprolactam where the ε-caprolactam content is less than 50% by weight, in particular polyhexamethyleneadipamide. However, it is also possible to use mixtures of different polyamides.

The polyamide prepolymers having a viscosity number of from 40 to 80 ml/g (component C)) can be prepared by the processes described in EP-A-129 195 and -129 196.

In these processes, an aqueous solution of the monomers is heated under elevated pressure to 250°-300° C. with simultaneous evaporation of water and formation of a prepolymer, then prepolymer and steam are continuously separated, the steam is rectified and the entrained diamines are recycled. Finally, the prepolymer is passed into a polycondensation zone and polycondensed at from 250° to 300° C. under a superatmospheric pressure of from 1 to 10 bar. An essential requirement of the process is that the aqueous salt solution be heated under a superatmospheric pressure of from 1 to 10 bar within a residence time of less than 60 seconds, on exit from the vaporizer zone the degree of conversion being advantageously at least 93% and the water content of the prepolymer being not more than 7% by weight.

These short residence times substantially prevent the formation of triamines.

The aqueous solutions used generally have a monomer content of from 30 to 70% by weight, in particular from 40 to 65% by weight.

The aqueous salt solution is advantageously passed at from 50° to 100° C. continuously into a vaporizer zone where the aqueous salt solution is heated to 250°-330° C. under a superatmospheric pressure of from 1 to 10, preferably from 2 to 6, bar. It will be understood that the temperature employed is above the melting point of the particular polyamide to be prepared.

As mentioned earlier, it is essential that the residence time in the vaporizer zone is not more than 60 seconds, preferably from 10 to 55 seconds, in particular from 10 to 40 seconds.

The degree of conversion on exit from the vaporizer zone is not less than 93%, preferably from 95 to 98%, and the water content is preferably within the range from 2 to 5, in particular from 1 to 3, % by weight.

The vaporizer zone is advantageously constructed as a tube bundle. Of particular advantage are tube bundles in which the cross-section of the individual tubes periodically is recurringly tubular or slot-shaped.

It has also been found to be advantageous to pass the mixture of prepolymers and steam as it emerges from the vaporizer zone and before phase separation has taken place through a tubular mass transfer zone which has been equipped with internal fitments. This zone is kept under the temperature and pressure conditions employed in the vaporizer zone. The internal fitments, for example packing such as Raschig rings, metal rings or in particular wire netting, constitute a large surface area. This ensures intimate contact between the phases, i.e. prepolymer and steam, and serves to considerably reduce the amount of diamine liberated with the steam. In general, a residence time of from 1 to 15 minutes is maintained in the mass transfer zone. The mass transfer zone is advantageously constructed as a tube bundle.

The two-phase mixture of steam and prepolymer emerging from the vaporizer zone or the mass transfer zone is separated. Separation generally takes place automatically in a vessel due to the physical differences; the lower part of the vessel is advantageously constructed as a polymerization zone. The liberated vapors consist essentially of steam and diamines entrained in the course of the evaporation of the water. These vapors are passed into a column and rectified. Suitable columns are for example packed columns, bubble cap columns or sieve plate columns having from 5 to 15 theoretical plates. The column is advantageously operated under the same pressure conditions as the vaporizer zone. The diamines present in the vapors are separated off in the course of the rectification and fed back into the vaporizer zone. It is also possible to feed the diamines into the downstream polymerization zone. The rectified steam obtained is taken off at the top of the column.

The prepolymer obtained, which according to its degree of conversion consists essentially of low molecular weight polyamide with or without residues of unconverted salts, is passed into a polymerization zone. In the polymerization zone the resulting melt is polycondensed at from 250° to 330° C., in particular at from 270° to 310° C., under a superatmospheric pressure of from 1 to 10 bar, in particular from 2 to 6 bar. Advantageously, the vapors which are released here are rectified together with the abovementioned vapors in the column; preferably a residence time of from 5 to 30 minutes is maintained in the polycondensation zone. The polyamide prepolymer thus obtained, which generally has a viscosity number of from 40 to 80 ml/g, preferably from 45 to 60 ml/g, measured on a 0.5% strength by weight solution in 96% strength sulfuric acid at 23° C., is removed continuously from the condensation zone.

In a preferred process, the polyamide prepolymer thus obtained is passed as a molten liquid through a discharge zone with simultaneous removal of the residual water present in the melt. Suitable discharge zones are for example devolatilization extruders. The melt thus freed of water is then cast in strand form and granulated. The granules obtained (component C)) are melted at about 20° C. above the melting point of component C) (at about 280° C. in the case of polyhexamethyleneadipamide), preferably in a twin-screw extruder, and mixed with the thermoplastic polyester elastomer (component A)) and with or without component B), and the mixture is extruded in strand form, cooled and granulated.

In a particularly preferred embodiment, it is also possible to add component A) and any B), if used, straight away to the devolatilization extruder, in which case the devolatilization extruder is customarily equipped with suitable mixing elements, such as kneaders. The mixture is then likewise extruded in strand form, cooled and granulated.

These granules are condensed in solid phase under an inert gas atmosphere at a temperature below the melting point, for example from 170° to 240° C., to the desired viscosity in a continuous or batchwise manner. The batchwise solid phase condensation can be carried out for example in tumble dryers, while the continuous solid phase condensation can be carried out in heat treatment tubes through which a hot inert gas flows. Preference is given to the continuous solid phase condensation, the inert gas used being nitrogen or superheated steam, advantageously steam obtained at the top of the column.

Following the postcondensation in solid phase the viscosity number, measured on a 0.5% strength by weight solution in 96% strength sulfuric acid at 23° C., is in general within the range from 120 to 500 ml/g, preferably from 130 to 200 ml/g.

The thermoplastic molding compositions of the present invention are notable for a balanced range of properties, in particular for good flowability and flame resistance. They are suitable for producing fibers, films and moldings.

EXAMPLES

Component A

A block polyether-ester composed essentially of units derived from poly(1,4-butylene glycol), terephthalic acid and 1,4-butanediol, having a Shore hardness of 92 A or 40 D (according to ASTM D-2240) and a melt flow index of from 4 to 6.5 g/10 min (190° C., 2.16 kg load) (Hytrel ® 4056 from DuPont de Nemours and Company).

Component C

A polyamide prepolymer prepared by the process described in EP-A-129 195 by dissolving 669.6 kg of an equipmolar adipic acid/hexamethylenediamine salt at 80° C. in 330.4 kg of water and continuously polycondensing in a tube bundle reactor at 283° C. and 2.8 bar with a throughput corresponding to a polyamide rate of 50 kg/h. The product has a viscosity number of 58 ml/g, measured on a 0.5% strength by weight solution in concentrated sulfuric acid at 23° C.

EXAMPLES 1 TO 3

The polyamide prepolymer (component C) was screw discharged in melt form from the separation vessel of the polycondensation plant into a twin-screw extruder (ZSK 53 from Werner & Pfleiderer) and mixed with component A at 280° C. and 100 rpm. A vacuum was then applied for devolatilization in the course of which virtually no postcondensation occurred. The product was extruded in strand form, cooled, granulated and postcondensed with superheated steam at 182° C. in the course of a residence time of 11 hours. The viscosity number was 140 ml/g, measured on a 0.5% strength by weight solution in concentrated sulfuric acid at 23° C.

Comparative Examples C1 TO C3

Examples 1 to 3 were repeated, except that component A was replaced by other additives.

Comparative Example C1

Aluminum tristearate (Alugel ® from Bärlocher, Munich) was incorporated.

Comparative Example C2

An ethylene/n-butyl acrylate/acrylic acid copolymer having a weight ratio of ethylene:n-butyl acrylate:acrylic acid of 82:3:5 and a melt flow index MFI of 10.5 g/10 min (at 190° C. under a load of 2.16 kg) was incorporated.

Comparative Example C3

An ethylene/propylene rubber (weight ratio ethylene:propylene of 45:55), grafted with 1% by weight of maleic anhydride, having a melt flow index MFI of 150 g/10 min (at 23° C. under a load of 21.6 kg) (Exxelor ® 1803 from Exxon Chemical) was incorporated.

Comparative Example C4

The procedure of Examples 1 to 3 was repeated, except that no component A was used.

Comparative Examples C5 TO C7

Component C*

A polyamide consisting of units derived from hexamethylenediamine and adipic acid and having a viscosity number of 145 ml/g (measured on a 0.5% strength by weight solution in concentrated sulfuric acid at 23° C.) (Ultramid ® A3 from BASF AG).

The polyamide (component C*) was mixed in granule form with component A (C5) and aluminum tristearate (Alugel ® from Bärlocher, Munich) (C7) or aluminum tristearate (C6) in a twin-screw extruder (ZSK 53 from Werner & Pfleiderer) at 280° C., extruded in strand form, cooled and granulated.

The products were measured in respect of the modulus of elasticity in accordance with DIN 54 457, the tensile strength in accordance with DIN 54 455 and the melt flow index MFI in accordance with DIN 53 735 (at 285° C. under a load of 5 kg). The penetration energy $W_{tot}$ was determined in accordance with DIN 53 443 at 23° C. on 2 mm thick round disks 60 mm in diameter injection molded at 280° C. A test mold for vacuum cleaner lids was used to determine the fastest possible cycle time at 280° C. The burning test was carried out in accordance with UL94 (ANSI) on flat bars having the thicknesses 0.8 mm/1.6 mm/3.2 mm.

The compositions and properties are summarized in the Table.

TABLE

| Example | Composition [% by wt] | | | | Modulus of elasticity [kJ/m²] | Tensile strength [kJ/m²] | $W_{tot}$ [J/m] | Burning test | Cycle time [sec] | MFI [g/10 min] |
|---|---|---|---|---|---|---|---|---|---|---|
| | A) | C) | C*) | Additives | | | | | | |
| 1 | 1 | 99.0 | — | — | 3031 | 85 | 104 | V2/V2/V- | 31 | 138 |
| 2 | 2 | 98.0 | — | — | 2946 | 83 | 111 | V2/V2/V2 | 24 | 140 |
| 3 | 4 | 96.0 | — | — | 2888 | 81 | 120 | V2/V2/V2 | 24 | 155 |
| C1 | — | 99.3 | — | 0.7 Aluminum tristearate | 3010 | 86 | 30 | V-/V-/V- | 44 | 105 |
| C2 | — | 98.0 | — | 2.0 Ethylene/ n-butyl acrylate/ acrylic acid copolmyer | 2900 | 82 | 140 | V-/V-/V- | 46 | 98 |
| C3 | — | 98.0 | — | 2.0 Graft rubber | 2895 | 81 | 140 | V-/V-/V- | 44 | 101 |
| C4 | — | 100.0 | — | — | 3025 | 85 | 102 | V2/V2/V2 | 40 | 109 |
| C5 | 2 | — | 98.0 | — | 2910 | 84 | 90 | V-/V-/V- | 26 | 133 |
| C6 | — | — | 99.3 | 0.7 Aluminum tristearate | 3025 | 86 | 38 | V2/V2/V2 | 28 | 160 |
| C7 | 2 | — | 97.3 | 0.7 Aluminum tristearate | 2955 | 82 | 45 | V2/V2/V2 | 26 | 142 |

We claim:

1. A process for preparing a thermoplastic molding composition, which process comprises mixing
   A) from 0.5 to 5% by weigh of a thermoplastic polyester elastomer and
   B) from 0 to 50% by weight of fibrous or particulate fillers or mixtures thereof into a melt of
   C) from 40 to 99.5% by weight of a polyamide prepolymer having a viscosity number of from 40 to 80 ml/g and subsequently post condensating in the solid phase.

* * * * *